(No Model.)
W. STRAIT.
HORSE HAY RAKE.
No. 594,441. Patented Nov. 30, 1897.
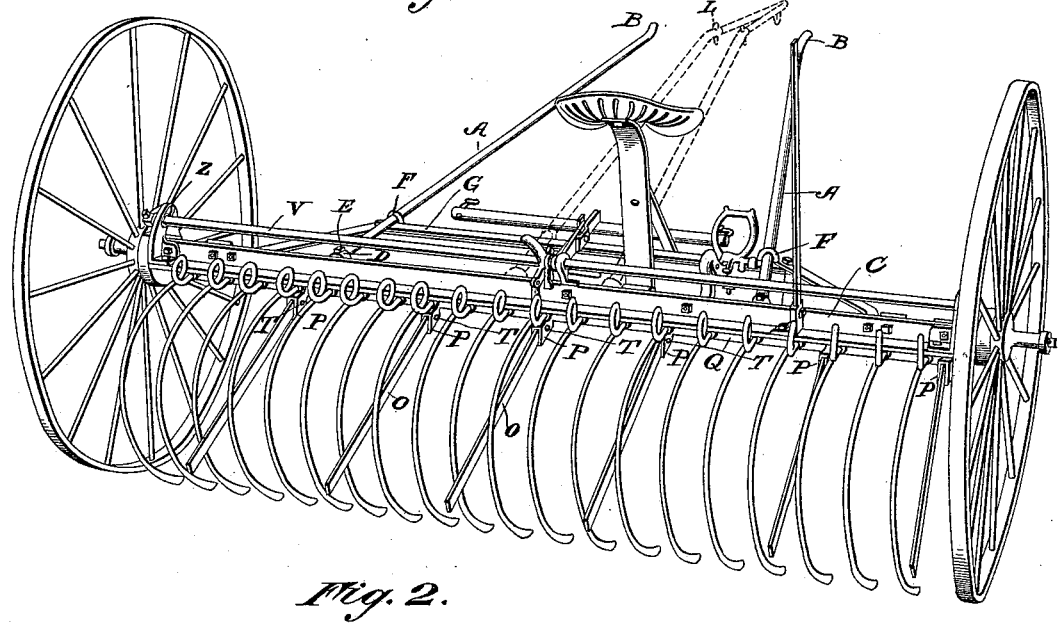
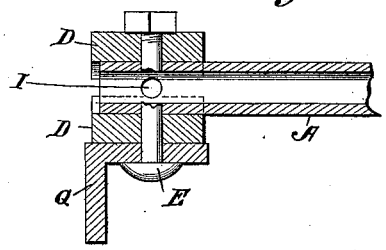
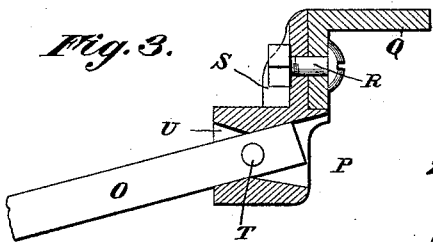
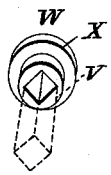
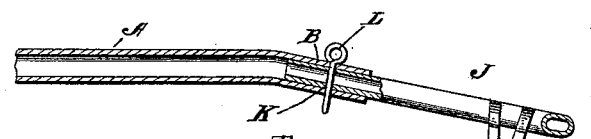
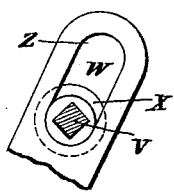
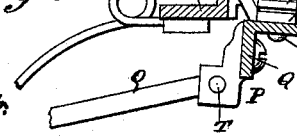
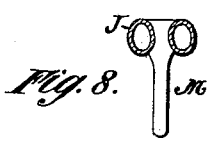
THE NORRIS PETERS CO., PHOTO-LITHO., WASHINGTON, D. C.

UNITED STATES PATENT OFFICE.

WILLIAM STRAIT, OF ELMIRA, NEW YORK.

HORSE HAY-RAKE.

SPECIFICATION forming part of Letters Patent No. 594,441, dated November 30, 1897.

Application filed December 7, 1894. Serial No. 531,152. (No model.)

*To all whom it may concern:*

Be it known that I, WILLIAM STRAIT, a citizen of the United States, residing at Elmira, in the county of Chemung and State of New York, have invented certain new and useful Improvements in Horse Hay-Rakes; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to horse hay-rakes, and is applicable to either draft or hand dumpers in most of its particulars.

My improvements consist in the following construction and combination of parts, details of which will first be fully set forth and described and the novel features then pointed out and claimed.

Figure 1 is a perspective view of the rake to which I have applied my improvements in the present instance. Fig. 2 is an enlarged detail sectional view of the pole and shaft attaching device. Fig. 3 is an enlarged detail sectional view of the cleaner-bar-attaching device. Fig. 4 is a detail sectional view of the convertible pole and shaft. Fig. 5 is a detail sectional view of the rake head and frame hereinafter referred to. Fig. 6 is a detail view of the thimble which carries the opposite ends of the dog or pawl operating rod. Fig. 7 is a detail view of the slotted box which carries the opposite ends of the dog or pawl operating rod. Fig. 8 is a detail view of a portion of the pole-extension piece, showing the construction of the stop-bar.

I shall first describe the convertible shafts or thills and pole.

A A are the thills, preferably made of tubular metal, with their outer ends curved outwardly at B. These thills are adapted to be set inwardly in the position shown in dotted lines, being adjustable for that purpose, in order to provide a pole whereby the rake is adapted for draft with one or two horses.

C is the frame-bar, to which the thills are attached.

D are two bearings having concave opposing faces adapted to embrace the inner end of each thill upon its upper and lower side, and a locking-bolt E passes through both the bearings D, a hole through the thill A, and an opening through the angle-bar C, by means of which the thill is firmly clamped. Each thill is also secured to the forward thill frame-bar G by an eye F, which is bolted to bar G by a bolt H.

When it is desired to move the thills A inwardly to the position shown in dotted lines to form a pole, the bolts E and H are removed and the bearings D and eyes F are moved inwardly and reattached to the frame, suitable bolt-holes being provided in the frame-bars C and G at the points indicated in dotted lines. In the last-named position the thills A are turned one-quarter of a revolution, and the bolts E pass through the holes I in the ends of the thills, so that the outwardly-turned ends B, which, as thills, extend laterally outward, will then project downwardly for a purpose which will be described.

J is the pole-extension piece, being also a tubular metallic bar bent back upon itself, as shown, and adapted to telescope the openings in the outer ends of the thills. Suitable pin-holes are made in both the outer ends B and the pole-extension piece, and pins L, fitting said holes, serve as a means of attachment of the piece J to the thills when the device is used as a pole.

M is the stop-bar, the shank of which is made double concave, as shown at N, so as to adapt itself to the form of the tubular extension-piece J, it being rigidly held between the two arms thereof to prevent loosening or dislodgment.

It is essential in all properly-constructed rakes which are convertible from one to two horse draft to provide means for counteracting the change of position of the rake-frame consequent upon the raising or lowering of the free ends of the thills that is necessitated, because of the difference of normal heights of the said ends of the thills and pole above the ground. To obviate this objection when using the thills in juxtaposition as a pole, I cause the combined free ends to extend downwardly sufficiently to compensate for the said difference of heights of the thill and pole extremities. To carry out this result, I turn the laterally-projecting curved ends B of the thills downwardly one-quarter of a revolution, as shown in Figs. 1 and 4, and insert the extension-piece J, which when so inserted also projects downwardly, resulting, when the team is hitched thereto, in raising the rake-frame to a proper height. The bearings D and F provide for the insertion and attachment of the thills in both positions, the bearings D having a swiveling motion on the bolt E, compensating for any variation of adjustment necessary.

O are a series of cleaner bars or fingers, each of which is independently pivoted, so as to rise and fall within a limited range without affecting the others.

P are the series of boxes in which these cleaner-bars are hung. They are each secured to the rake-frame bar Q and are provided with a vertical and a horizontal edge adapted to overlap the edge or angle of the bar Q, so that a single bolt passed through the bar Q and box P will rigidly unite the same and prevent any deflection or loosening of said box. The nut on the bolt R rests between flanges S on the box and prevents the turning of the nut.

T is the pivotal bolt of the cleaner-bar O, which passes through the opening or slot in the box P and permits the inner end of the bar O to oscillate therein. The upper and lower walls of this opening U have double-inclined faces, substantially as shown in Fig. 3, whereby substantial bearings are provided for the cleaner-bar when at the limits of its throw and thereby take the strain off the bolt T and prevent the liability of its breaking.

V is the dog or pawl operating rod, which is preferably made of iron, having an angular cross-section. To provide for its proper oscillation in its bearings at its center and ends, it is provided with a series of thimbles W, having central apertures corresponding with the shape of the rod V, circular exterior bearings, and a flange X upon one side thereof. This flange acts to hold the thimble in its place on the rod within its housing by being interposed between the housings and operating-lever on the dog-rod or by having a set-screw inserted in said flange for the purpose of holding the thimble in its proper place. In turning corners or in backing the rake the dogs slip over the ratchets on the wheels by means of the torsion of the rod V.

Instead of the rod V acting by means of its torsion the thimble-bearings at the opposite ends of the rod V may be arranged to move in a slotted box Z, whereby the ends of the rod and its dogs may be deflected radially outward for the purpose of slipping the ratchet-teeth on the wheels.

I claim—

1. The combination with a pair of adjustable shafts or thills designed by their adjustment to be converted into a pole or tongue, of means for causing the extremities of the shafts or thills to depend when in position to constitute a pole or tongue, and a detachable pole-extension piece extending in the direction of the said depending extremities.

2. The combination of detachable and rotary thills bent at their outer ends, a pole-extension piece adapted to be attached thereto, devices for holding the thills with their bent ends projecting laterally outward when used as thills, and devices for holding the thills with their bent ends projecting downwardly when used as a pole or tongue.

3. The convertible rotary pole and thills, combined with a swiveling box in which the pole or thills may be rotated.

4. The combination with a rake-frame or the like of a pivoted thill or pole bearing block adjustable upon the frame independently of its pivoted movement, an eye adjustable upon the frame independently of the bearing-block and a thill or pole carried by the bearing-block and eye.

5. The combination of slotted dog-carrying boxes, and a dog-carrying rod carried therein having thimble-bearings thereon working in said boxes.

6. A pole-extension piece composed of a cylindrical rod or tube having its ends bent into divergent relation and a stop concaved upon its opposite sides and wedged between the sides of the pole-extension piece.

7. The swivel-socket bearing comprising an upper and lower box having bearing-surfaces, a single swiveling bolt uniting the two, combined with an interposed pole or thill having an opening or openings adapted to register with the swiveling bolt.

8. The combination with a rake-frame, of rotary tubular thills or shafts, convertible into a pole or tongue, of means for causing the extremities of the thills or shafts, to depend when so converted, a pole-extension piece, and pin-openings at right angles in one end of the thills designed to receive securing-pins, and pin-holes at the opposite ends of the thills for the reception of securing-pins.

In testimony whereof I affix my signature in presence of two witnesses.

WM. STRAIT.

Witnesses:
J. FRED. KELLEY,
FENELON B. BROCK.